United States Patent
Li et al.

(10) Patent No.: US 9,416,264 B2
(45) Date of Patent: *Aug. 16, 2016

(54) COMPATIBILIZED POLYPROPYLENE HETEROPHASIC COPOLYMER AND POLYLACTIC ACID BLENDS FOR INJECTION MOLDING APPLICATIONS

(71) Applicant: FINA TECHNOLOGY, INC., Houston, TX (US)

(72) Inventors: Fengkui Li, Houston, TX (US); John Ashbaugh, Houston, TX (US); Gabriel Desille, Nivelles (BE); Caroline Schils, Sint-Martens-Lennik (BE)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,930

(22) Filed: Apr. 15, 2015

(65) Prior Publication Data

US 2015/0218356 A1    Aug. 6, 2015

Related U.S. Application Data

(60) Continuation of application No. 13/956,514, filed on Aug. 1, 2013, now Pat. No. 9,034,990, which is a division of application No. 13/022,656, filed on Feb. 8, 2011, now Pat. No. 8,530,577, which is a continuation-in-part of application No. 12/165,051, filed on Jun. 30, 2008, now Pat. No. 8,759,446.

(51) Int. Cl.
| | |
|---|---|
| *C08L 23/10* | (2006.01) |
| *C08L 23/14* | (2006.01) |
| *B29C 45/72* | (2006.01) |
| *C08L 51/06* | (2006.01) |
| *C08L 67/04* | (2006.01) |

(52) U.S. Cl.
CPC ............... *C08L 23/142* (2013.01); *B29C 45/72* (2013.01); *C08L 23/10* (2013.01); *C08L 23/14* (2013.01); *C08L 51/06* (2013.01); *C08L 67/04* (2013.01); *C08L 2201/06* (2013.01); *C08L 2205/025* (2013.01); *C08L 2205/03* (2013.01); *C08L 2205/08* (2013.01); *C08L 2207/02* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 4,271,060 A | 6/1981 | Hubby | |
| 5,001,205 A | 3/1991 | Hoel | |
| 5,236,998 A | 8/1993 | Lundeen et al. | |
| 5,589,555 A | 12/1996 | Zboril et al. | |
| 6,734,253 B2 * | 5/2004 | Krabbenborg | C08F 8/34 524/451 |

FOREIGN PATENT DOCUMENTS

JP    2005-307128    * 11/2005

OTHER PUBLICATIONS

Sun, Journal of Applied Polymer Science, vol. 57, 1043-1054 (1995).*
Al-Malaika, Journal of Applied Polymer Science, vol. 79, 1401-1415 (2001).*
English translation of JP 2005-307128—Nov. 2005.*

* cited by examiner

*Primary Examiner* — Robert C Boyle
(74) *Attorney, Agent, or Firm* — Albert Shung

(57) ABSTRACT

A method of forming a compatibilized polymeric blend may include providing a polyolefin that includes a propylene heterophasic copolymer. The polyolefin may have an ethylene content of at least 10 weight percent based on a total weight of the polyolefin. The method may include melt blending the polyolefin with a polylactic acid and a reactive modifier to form the compatiblized polymeric blend. The reactive modifier may be a glycidyl methacrylate grafted polypropylene (PP-g-GMA). The reactive modified may be produced by contacting a polypropylene, a glycidyl methacrylate, a multifunctional acrylate comonomer, and an initiator under conditions suitable for the formation of PP-g-GMA having a grafting yield in a range from 1 wt. % to 15 wt. %.

17 Claims, 6 Drawing Sheets

- Sample 1 (PP)
- Sample 2 (PP + PLA)
- Sample 3 (PP + PLA + Nylon)
- Sample 4 (PP + PLA + GMA)
- Sample 5 (PP + PLA + Lotader)
- Sample 6 (PP + PLA + Polybond)
- Sample 7 (PP + PLA + EMA)
- Sample 8 (PP + PLA + SEBS)

COMPATIBILIZED POLYPROPYLENE
HETEROPHASIC COPOLYMER AND
POLYLACTIC ACID BLENDS FOR
INJECTION MOLDING APPLICATIONS

CROSS-REFERENCE TO RELATED APPLICATIONS

This application is a Continuation of U.S. patent application Ser. No. 13/956,514, filed on Aug. 1, 2013, which is a Divisional of U.S. application Ser. No. 13/022,656, filed on Feb. 8, 2011, now issued as U.S. Pat. No. 8,530,577, which is a continuation-in-part of U.S. patent application Ser. No. 12/165,051, filed Jun. 30, 2008, entitled "Compatibilized Polypropylene and Polylactic Acid Blends and Methods of Making and Using Same," now issued as U.S. Pat. No. 8,759,446, which is hereby incorporated by reference herein.

FIELD

Embodiments of the present invention generally relate to polymeric blends adapted for use in injection molding. In particular, embodiments of the invention relate to polypropylene impact copolymer and polylactic acid blends adapted for use in injection molding.

BACKGROUND

Synthetic polymeric materials, such as polypropylene and polypropylene comprising a rubber component (e.g., thermoplastic elastomer), are widely used in injection molding manufacturing of a variety of commercial end-uses including articles for automobiles or automobile parts, such as an interior material structure or article. While articles constructed from synthetic polymeric materials have widespread utility, these materials tend to degrade slowly, if at all, in a natural environment. In response to environmental concerns, interest in the production and utility of more readily biodegradable polymeric materials comprising polylactic acid, a biodegradable polymer, has been increasing. These materials, also known as "green materials", may undergo accelerated degradation in a natural environment.

However, the utility of these "green materials" is often limited by their poor mechanical and/or physical properties. In particular, polylactic acid is known to be brittle and exhibit low toughness, which results in unsatisfactorily low impact strength articles. Blends of polylactic acid with elastomeric materials or other impact modifying polymers have been proposed, however due to poor processability and/or undesirable mechanical properties, previous blends have not been used successfully in automotive part applications requiring impact strength and production efficiency. Therefore, a need exists for a biodegradable blend suitable for injection molding production of articles having improved impact strength, thus providing an environmentally friendly alternative to synthetic polymeric materials or metal in the fabrication of articles such as automotive parts, for example.

SUMMARY

Embodiments of the present invention include an injection molded article formed by a process including providing a polyolefin including one or more propylene heterophasic copolymers, the polyolefin having an ethylene content of at least 10 wt. % based on the total weight of the polyolefin; contacting the polyolefin with a polylactic acid and a reactive modifier to form a compatibilized polymeric blend, wherein the reactive modifier is produced by contacting a polypropylene, a multifunctional acrylate comonomer, and an initiator under conditions suitable for the formation of a glycidyl methacrylate grafted polypropylene (PP-g-GMA) having a grafting yield in a range from 1 wt. % to 15 wt. %; and injection molding the compatibilized polymeric blend into an article.

One or more embodiments include the article of the preceding paragraph, wherein the one or more propylene heterophasic copolymers has an average ethylene content in a range from 11.5 wt. % to 18 wt. % based on the total weight of the copolymers.

One or more embodiments include the article of any preceding paragraph, wherein the polyolefin further includes an elastomer comprising ethylene.

One or more embodiments include the article of any preceding paragraph, wherein the polyolefin further comprises polyethylene.

One or more embodiments include the article of any preceding paragraph, wherein the polyolefin has an ethylene content in a range from 11.5 wt. % to 18 wt. % based on the total weight of the polyolefin.

One or more embodiments include the article of any preceding paragraph, wherein the grafting yield of glycidyl methacrylate (GMA) is at least 1.5 wt. %.

One or more embodiments include the article of any preceding paragraph, wherein the grafting yield of glycidyl methacrylate (GMA) is in a range from about 2 wt. % to about 15 wt. %.

One or more embodiments include the article of any preceding paragraph, wherein the article exhibits a flexural modulus in a range from 150 kpsi to 500 kpsi.

One or more embodiments include the article of any preceding paragraph, wherein the article exhibits a tensile modulus in a range from 170 kpsi to 400 kpsi.

One or more embodiments include the article of any preceding paragraph, wherein the article exhibits a tensile yield strength in a range from 2800 psi to 4500 psi.

One or more embodiments include the article of any preceding paragraph, wherein the article exhibits a notched Izod impact strength in a range from 2.1 ft-lb/in to 15 ft-lb/in.

One or more embodiments include the article of any preceding paragraph, wherein the article exhibits a flexural modulus of at least 150 kpsi and a notched Izod impact strength in a range from 2.1 ft-lb/in to 15 ft-lb/in.

One or more embodiments include the article of any preceding paragraph, wherein the article exhibits a flexural modulus of at least 150 kpsi and a notched Izod impact strength in a range from 3 ft-lb/in to 15 ft-lb/in.

One or more embodiments include the article of any preceding paragraph, wherein the article is an automotive part.

One or more embodiments include methods of forming the injection molded article. The methods generally include providing a polyolefin including one or more propylene heterophasic copolymers, the polyolefin having an ethylene content of at least 10 wt. % based on the total weight of the polyolefin; melt blending the polyolefin with a polylactic acid and a reactive modifier to form a compatiblized polymeric blend, wherein the reactive modifier is produced by contacting a polypropylene, a multifunctional acrylate comonomer, and an initiator under conditions suitable for the formation of a glycidyl methacrylate grafted polypropylene (PP-g-GMA) having a grafting yield in a range from 1 wt. % to 15 wt. %; and injection molding the compatibilized polymeric blend into an article.

One or more embodiments include the method of the preceding paragraph, wherein the one or more propylene heterophasic copolymers has an average ethylene content in a range from 11.5 wt. % to 18 wt. % based on the total weight of the copolymers.

One or more embodiments include the method of any preceding paragraph, wherein the melt blending step includes melt blending the polyolefin with the polylactic acid, an inorganic filler, and the reactive modifier to form the compatibilized polymeric blend.

DETAILED DESCRIPTION

Introduction and Definitions

Figure 1:
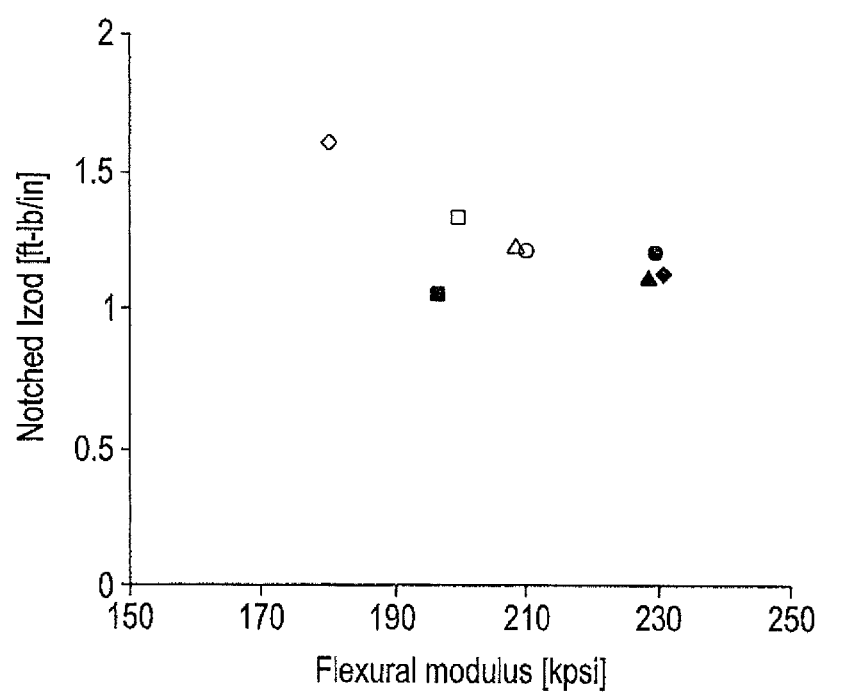
FIG. 1 illustrates the notched Izod impact strength versus flexural modulus for various polymer samples.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Unless otherwise designated herein, all testing methods are the current methods at the time of filing.

Compatibilized polymeric compositions including biodegradable polymeric components and methods of making and using the same are described herein. Embodiments of the present invention provide compatibilized polymeric blends formed by a process comprising providing a polyolefin comprising one or more polypropylene heterophasic copolymers, wherein the polyolefin has an ethylene content of at least 10 wt. %, and contacting the polyolefin with a polylactic acid and a reactive modifier to form a compatibilized polymeric blend. In one or more embodiments, the reactive modifier is produced by contacting a polypropylene, a multifunctional acrylate comonomer, and an initiator under conditions suitable for the formation of epoxy-functionalized polyolefin having a grafting yield of at least 1 wt. %. The compatibilized polymeric compositions may be used in injection molding manufacturing to form a wide variety of injected-molded articles including automotive structures or parts, such as an interior material structure or article for an automobile's interior.

Catalyst Systems

The polyolefins may be formed using any suitable catalyst system useful for polymerizing olefin monomers. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, the catalyst systems are used to form olefin-based polymer compositions which are interchangeably referred to herein as polyolefins. Once the catalyst system is prepared, as described above and/or as known to one skilled in the art, a variety of processes may be carried out using the catalyst system to form olefin-based polymers. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form olefin-based polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. It is further contemplated that the monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat may be removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer.

The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the olefin-based polymer (i.e., polyolefin) may be passed to a polymer recovery system for further processing, such as addition of additives and/or extrusion, for example.

Polymer Product

The compatibilized polymeric compositions are formed by contacting a polyolefin (PO), a polylactic acid (PLA), and a reactive modifier under conditions suitable for the formation of a blended material (i.e., compatibilized polymeric blend).

The polyolefin may be one or more polyolefins. The polyolefin (and blends thereof) formed via the processes described herein may include, but are not limited to, polyethylene, elastomers, plastomers, high density polyethylenes, low density polyethylenes, medium density polyethylenes, polypropylene, polypropylene copolymers, copolymers thereof and combinations thereof, for example.

The polyolefin of the present invention comprises a propylene-based polymer. As used herein, the term "propylene-based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

In an embodiment, the propylene-based polymer suitable for use in this disclosure may have a density of from about 0.895 g/cc to about 0.920 g/cc, or from about 0.900 g/cc to about 0.915 g/cc, or from about 0.905 g/cc to about 0.915 g/cc as determined in accordance with ASTM D1505.

In an embodiment, the propylene-based polymer may have a melting point ($T_m$) (as measured by differential scanning calorimetry) of at least about 140° C., or from about 150° C. to about 175° C., or from about 155° C. to about 170° C., for example.

In an embodiment, the propylene-based polymer may have a melt flow rate (MFR) (as determined in accordance with ASTM D-1238 condition "L") of at least about 1 dg/min., or from about 2 dg/min. to about 50 dg/min., or from about 5 dg/min. to about 40 dg/min., for example.

The propylene-based polymer comprises one or more polypropylene heterophasic copolymers (or impact copolymer). Polypropylene heterophasic copolymer (PPHC) refers to a polypropylene or polypropylene copolymer matrix phase joined to (i.e., containing) a copolymer phase or component. The copolymer phase includes ethylene and higher alpha-olefin polymer such as amorphous ethylene-propylene copolymer, for example.

The copolymer phase of a PPHC may be a random copolymer of propylene ($C_3$) and ethylene ($C_2$), also referred to as an ethylene/propylene rubber (EPR). Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 18 wt. % of the PPHC, alternatively from greater than 18 wt. % to 30 wt. % of the PPHC, alternatively at least 22 wt. % of the PPHC.

The amount of ethylene present in the EPR portion of the PPHC may be from 35 wt. % to 50 wt. %, alternatively from 40 wt. % to 45 wt. % based on the total weight of the EPR portion. The amount of ethylene present in the EPR portion of the PPHC may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 cm$^{-1}$/900 cm$^{-1}$ is calculated for each ethylene concentration and a calibration curve may then be constructed. Linear regression analysis on the calibration curve can then be carried out to derive an equation that is then used to determine the EPR ethylene content for a sample material.

In an embodiment, the copolymer phase of a PPHC may have an ethylene concentration of at least 8 wt. %, or at least 10 wt. %, or at least 11 wt. %, or in a range from 11.5 wt. % to 18 wt. %, or in a range from 12.5 wt. % to 15 wt. % based on the total weight of the PPHC. In general, increasing the ethylene content, increases the impact strength of the PPHC. Examples of suitable polypropylene heterophasic copolymer include without limitation products Total 5571 (having a $C_2$ content of 11 wt. %), PPC7810 (having a $C_2$ content of 13.5 wt. %) and PPC9760 (having a $C_2$ content of 8 wt. %), which are commercially available products from Total Petrochemicals.

When the propylene-based polymer comprises more than one polypropylene heterophasic copolymer, the ethylene content of the EPR portions for multiple PPHCs may be calculated as an average ethylene content by weight-averaging the ethylene contents of the individual PPHCs based on the relative quantities of each PPHC. For example, a polyolefin comprising 22 wt. % of a first PPHC which has an ethylene content of 8 wt. % (e.g., PPHC 9760), and 65 wt. % of a second PPHC which has an ethylene content of 13.5 wt. % (e.g., PPHC 7810), has an average ethylene content value equal to 10.5 wt. %, as calculated by multiplying the relative quantities of the individual PPHCs by their ethylene content (i.e., 0.22×8 wt. %+0.65×13.5 wt. %=10.5 wt. %).

In an embodiment, the one or more polypropylene heterophasic copolymers may have a concentration in a range from about 80 wt. % to 100 wt. % based on the total weight of the polyolefin.

In an embodiment, the propylene-based polymer may optionally include polypropylene homopolymer. Unless otherwise specified, the term "polypropylene homopolymer" refers to propylene homopolymers, i.e., polypropylene, or those polyolefins composed primarily of propylene and may contain up to 0.5 wt. % of other comonomers, including but not limited to $C_2$ to $C_8$ alpha-olefins (e.g., ethylene and 1-butene), wherein the amount of comonomer is insufficient to change the amorphous or crystalline nature of the propylene polymer significantly. Despite the potential presence of small amounts of other comonomers, the polypropylene is generally referred to as a polypropylene homopolymer.

In an embodiment, the propylene-based polymer may optionally include polypropylene-based random copolymer. Unless otherwise specified, the term "propylene-based random copolymer" refers to those copolymers composed primarily of propylene and an amount of at least one comonomer, wherein the polymer includes at least about 0.1 wt. %, or at least about 0.8 wt. %, or at least about 2 wt. %, or from about 0.5 wt. % to about 5.0 wt. % comonomer relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene, and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

In an embodiment, the propylene-based polymer may be formed from a metallocene catalyst. In another embodiment, the propylene-based polymer is formed from a Zieglar-Natta catalyst.

In an embodiment, the polyolefin of the present invention may optionally include an elastomer. The elastomer may provide additional impact resistance to the compatibilized polymeric blend. In effect, incorporation of an elastomer may effectively increase the elastomeric impact behavior of the blend provided by the ethylene/polypropylene rubber portion of the PPHC. Thus, incorporation of an elastomer may be particularly useful when the PPHC has an ethylene content (or average $C_2$ content) less than about 12.5 wt. %. Examples of suitable elastomers include, without limitation, elastomers comprising ethylene such as ethylene propylene rubber (EPR) and ethylene propylene diene monomer (EPDM), for example. EPDM is an elastomer that is similar to the EPR portion in the polypropylene heterophasic copolymers. The elastomer may have a concentration in a range from about 1 wt. % to 20 wt. % based on the total weight of the polyolefin.

The polyolefin of the present invention may optionally include polyethylene. Polyethylenes, such as high density polyethylene (HDPE), for example, may also provide additional impact resistance as well as scratch-resistance to the compatibilized polymeric blend while also increasing the stiffness of the blend. The incorporation of a polyethylene may be particularly useful when the PPHC has an ethylene content (or average $C_2$ content) less than about 12.5 wt. %. An example of a suitable HDPE includes, without limitation, product M6091 commercially available from Total Petrochemicals. The polyethylene may have a concentration in a range from about 1 wt. % to 20 wt. % based on the total weight of the polyolefin.

In an embodiment, the polyolefin may have a propylene concentration of at least 30 wt. %, or from about 30 wt. % to about 96 wt. %, or from about 40 wt. % to about 96 wt. %, or from about 40 wt. % to about 85 wt. % based on the total weight of the compatibilized polymeric composition, for example.

In an embodiment, the polyolefin may have an ethylene concentration of at least 10 wt. %, or at least 11 wt. %, or in a range from 11.5 wt. % to 18 wt. %, or in a range from 12.5 wt. % to 15 wt. % based on the total weight of the polyolefin.

The one or more polyolefins (PO) are contacted with a polylactic acid (PLA) and a reactive modifier to form a compatibilized polymeric composition (which may also be referred to herein as a compatibilized blend or compatibilized blended material). Such contact may occur by a variety of methods. For example, such contact may include blending the polyolefin and the polylactic acid in the presence of the reactive modifier under conditions suitable for the formation of a blended material. Such blending may include dry blending, melt blending, melt compounding, or combinations thereof, by known blending techniques such as mixing and extrusion (e.g., twin-screw extrusion), for example.

The polylactic acid may include any polylactic acid capable of blending with an olefin based polymer. For example, the polylactic acid may be selected from poly-L-lactide (PLLA), poly-D-lactide (PDLA), poly-LD-lactide (PDLLA) and combinations thereof. The polylactic acid may be formed by known methods, such as dehydration condensation of lactic acid (see, U.S. Pat. No. 5,310,865, which is incorporated by reference herein) or synthesis of a cyclic lactide from lactic acid followed by ring opening polymerization of the cyclic lactide (see, U.S. Pat. No. 2,758,987, which is incorporated by reference herein), for example. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

In an embodiment, the polylactic acid may have a specific gravity of from about 1.228 to about 1.255, or from about 1.23 to about 1.25 or from about 1.235 to about 1.245 (as determined in accordance with ASTM D792), for example.

In an embodiment, the polylactic acid may exhibit a crystalline melt temperature of from about 140° C. to about 190° C., or from about 145° C. to about 185° C. or from about 150° C. to about 180° C. (as determined in accordance with ASTM D3418).

In an embodiment, the polylactic acid may exhibit a glass transition temperature of from about 45° C. to about 85° C., or from about 50° C. to about 80° C. or from about 50° C. to about 70° C. (as determined in accordance with ASTM D3417).

In an embodiment, the polylactic acid may exhibit a tensile yield strength of from about 4,000 psi to about 25,000 psi, or from about 5,000 psi to about 10,000 psi or from about 5,500 psi to about 8,500 psi (as determined in accordance with ASTM D638), for example.

In an embodiment, the polylactic acid may exhibit a tensile elongation of from about 0.5% to about 10%, or from about 1.0% to about 8% or from about 1.5% to about 6% (as determined in accordance with ASTM D638), for example.

In an embodiment, the polylactic acid may exhibit a notched Izod impact of from about 0.1 ft-lb/in to about 0.8 ft-lb/in, or from about 0.15 ft-lb/in to about 0.6 ft-lb/in or from about 0.2 ft-lb/in to about 0.5 ft-lb/in (as determined in accordance with ASTM D256), for example.

In an embodiment, the compatibilized polymeric composition may include from about 1 wt. % to about 49 wt. %, or from about 3 wt. % to about 20 wt. %, or from about 5 wt. % to about 12 wt. % polylactic acid based on the total weight of the compatibilized polymeric composition, for example.

As used herein, the term "reactive modifier" refers to polymeric additives that, when directly added to a molten blend of immiscible polymers (e.g., the polyolefin and the PLA), may chemically react with one or both of the blend components to increase adhesion and stabilize the blend. The reactive modifier may be incorporated into the polymeric composition via a variety of methods such as melt blending, melt compounding, or combinations thereof, and by known blending techniques such as mixing and extrusion (e.g., twin-screw extrusion), for example.

The reactive modifier may include functional polymers capable of compatibilizing a blend of polyolefin and polylactic acid (PO/PLA blend). The functional polymer is a graftable polyolefin selected from polypropylene, polyethylene, homopolymers thereof, copolymers thereof, and combinations thereof.

In an embodiment, the reactive modifier comprises an epoxy-functionalized polyolefin. Examples of epoxy-functionalized polyolefins suitable for use in this disclosure include without limitation epoxy-functionalized polypropylene such as glycidyl methacrylate grafted polypropylene (PP-g-GMA), epoxy-functionalized polyethylene such as polyethylene co-glycidyl methacrylate (PE-co-GMA), and combinations thereof. An example of an epoxy-functionalized polyethylene suitable for use in this disclosure includes LOTADER® GMA products such as, for example, product LOTADER® AX8840, which is a random copolymer of ethylene and glycidyl methacrylate (PE-co-GMA) having 8% GMA content (as measured by FTIR), or product LOTADER® AX8900 which is a random terpolymer of ethylene, methyl acrylate and glycidyl methacrylate having 8% GMA content, which are commercially available products from Arkema.

The reactive modifiers may be prepared by any suitable method. For example, the reactive modifiers may be formed by a grafting reaction. The reactive modifiers are formed by grafting in the presence of an initiator, such as peroxide. Examples of initiators may include LUPERSOL® 101 and TRIGANOX® 301, commercially available from Arkema, Inc. The grafting reaction may occur in a molten state inside of an extruder, for example (e.g., "reactive extrusion").

In another embodiment, the reactive modifier comprises PP-g-GMA. PP-g-GMA may be prepared by any suitable method such as for example by grafting GMA onto polypropylene in the presence of an initiator such as peroxide. The grafting reaction of GMA onto PP may be conducted in a molten state inside an extruder such as for example a single screw extruder or a twin-screw extruder. For example, a feedstock comprising PP, GMA, and initiator (i.e., peroxide) may be fed into an extruder reactor sequentially along the extruder, alternatively the feedstock (i.e., PP, GMA, and initiator) may be pre-mixed outside and fed into the extruder. In an embodiment, the initiator may be used in an amount of from 0.03 wt. % to 2 wt. %, or from 0.2 wt. % to 0.8 wt. %, or from 0.3 wt. % to 0.5 wt. % based on the total weight of the compatibilized polymeric blend.

In an alternate embodiment, the reactive modifier PP-g-GMA may be prepared using a multi-functional acrylate comonomer in order to provide the resulting PP-g-GMA reactive modifier with a higher grafting yield, as compared to the grafting yields obtainable (i.e., less than 1 wt. %) by employing conventional grafting methods. Incorporation of the multi-functional acrylate comonomer boosts the grafting reaction to obtain a highly grafted GMA having a grafting yield in a range from 1 wt. % to 15 wt. %, or at least 1.5 wt. %, or in a range from about 2 wt. % to about 3 wt. %. The PP-g-GMA prepared using a multi-functional acylate comonomer is hereinafter referred to as a highly grafted GMA ("HGGMA").

The HGGMA is prepared by grafting GMA onto polypropylene in the presence of an initiator and a multi-functional acrylate comonomer. The multi-functional acrylate comonomers may comprise polyethylene glycol diacrylate, alkoxylated hexanediol diacrylate, trimethylolpropane triacrylate (TMPTA), or combinations thereof. Examples of multi-functional acrylate comonomers suitable for use in this disclosure include without limitation SR256 (polyethylene glycol diacrylate), CD560 (alkoxylated hexanediol diacrylate), SR351 (TMPTA), SR9003 (propoxylated neopentyl glycol diacrylate), SR454 (ethoxylated trimethylolpropane triacrylate), SR230 (diethylene glycol diacrylate), SR368D (tris(2-hydroxy ethyl)isocyanurate triacrylate), etc. which are commercially available from Sartomer.

The grafting reaction of GMA onto polypropylene in the presence of a peroxide and the multi-functional acrylate comonomer polyethylene glycol diacrylate is depicted in Scheme 1.

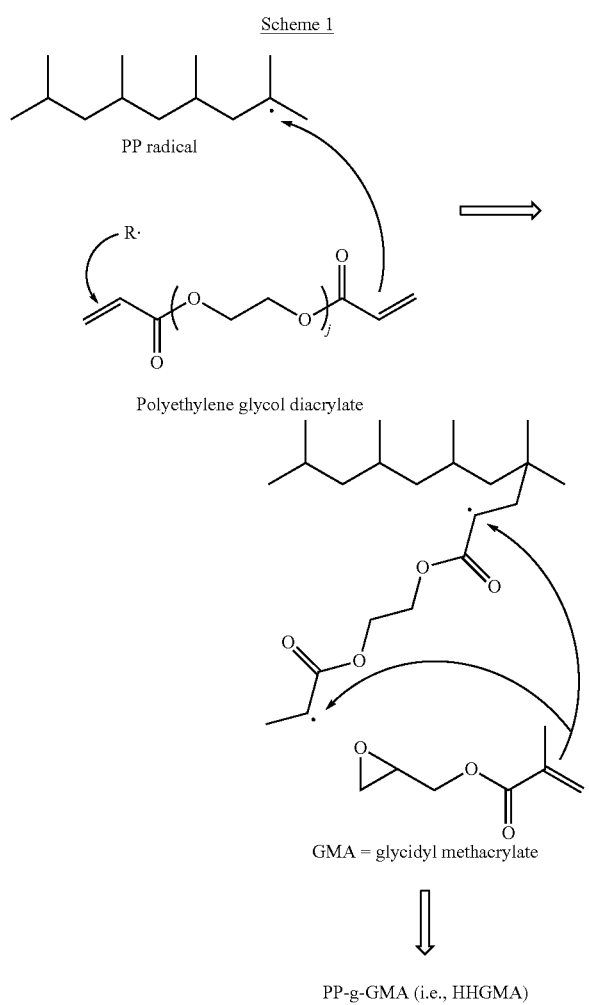

Scheme 1

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals which are generally unstable, tend to form free radicals through a step referred to as "β-scission." β-scission refers to a family of reactions wherein bonds that are in a beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e., the addition of the GMA) resulting in both a lower grafting of GMA and a polypropylene having a lower average molecular weight. However, in the reactions comprising a multi-functional acrylate comonomer, the multi-functional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

Furthermore, as shown in Scheme 1, multiple free radicals may exist on the grafted propylene-acrylate molecules thus making it easier to capture and initiate the reaction of GMA.

The reactivity of GMA towards acrylate free radicals may be higher than towards polypropylene tertiary macro-radicals. Consequently, PP-g-GMA prepared using a reaction mixture comprising a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HGGMA).

In an embodiment, the HGGMA reactive modifier is prepared from a reaction mixture comprising: a propylene having a concentration in a range from 80 wt. % to 99.5 wt. %, or from 90 wt. % to 99 wt. %, or from 95 wt. % to 99 wt. % based on the total weight of the reactive modifier; GMA having a concentration in a range from 0.5 wt. % to 20 wt. %, or from 1 wt. % to 10 wt. %, or from 1 wt. % to 5 wt. % grafting component based on the total weight of the reactive modifier; a multi-functional acrylate comonomer having a concentration in a range from 0.5 wt. % to 15 wt. %, or from 1.0 wt. % to 10 wt. %, or from 1.0 wt. % to 5.0 wt. % based on the total weight of the reactive modifier; and an initiator (e.g., peroxide) having a concentration in a range from 0.05 wt. % to 1.5 wt. %, or from 0.2 wt. % to 0.8 wt. %, or from 0.3 wt. % to 0.5 wt. %.

The amount of grafting of GMA onto the polypropylene may vary depending on a variety of factors such as the type of materials used and processing conditions. Such parameters may be varied by one of ordinary skill in the art with the benefits of this disclosure to produce reactive modifiers having a user-desired grafting yield. In an embodiment, a HGGMA reactive modifier may have a grafting yield of greater than 1 wt. %, or from 1 wt. % to 15 wt. %, or greater than 1.5 wt. %, or from 1.5 wt. % to 10 wt. %, or from 2 wt. % to 5.0 wt. %, as determined by FTIR. This grafting yield is a substantial improvement over conventionally prepared PP-g-GMA which is prepared using an otherwise similar composition but in the absence of a multi-functional acrylate comonomer. As a result, conventional grafting processes to prepare PP-g-GMA have substantially lower grafting yields. In particular, the conventional grafting process normally provides about 3 wt. % GMA in the feedstock to produce a PP-g-GMA having a grafting yield of less than 1% (i.e., in a range from about 0.5% to 0.8%) to produce a PP-g-GMA having less than 1% grafted GMA. In order to increase the quantity of grafted GMA, the conventional grafting process may provide the feedstock with 6 wt. % GMA to produce a PP-g-GMA having less than 2% grafted GMA. However, a disadvantage of this process is that the use of increasing amounts of GMA in the feedstock (e.g., 6 wt. %) of a grafting process that has a grafting yield of less than 1% is not economical and, thus, not a viable process to provide more highly grafted PP-g-GMA. In contrast, the incorporation of a multi-functional acrylate comonomer which advantageously boosts the grafting of GMA as previously described herein provides much higher grafting yields and a highly grafted PP-g-GMA. The use of HHGMA as a reactive modifier in the compatibilized polymeric compositions imparts better mechanical and thermal properties to the compositions, which is understood to be a result of the HHGMA providing better compatibilization between the PP/PLA components, as compared to using conventionally prepared PP-g-GMA (i.e., having a lower GMA content) as the reactive modifier.

The grafting yield may be determined using any suitable method. For example, the grafting yield may be determined by Fourier Transform Infrared Spectroscopy (FTIR) spectroscopy. In an embodiment, a method for determining the grafting yield comprises obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13 which is incorporated by reference herein in its entirety.

In an embodiment, the compatibilized polymeric composition is prepared from a process comprising contacting the polyolefin and the polylactic acid in the presence of the reactive modifier, wherein the reactive modifier has a concentration in a range from about 1 wt. % to about 15 wt. % or from about 3 wt. % to about 10 wt. % based on the total weight of the compatibilized polymeric composition, for example.

In an embodiment, the compatibilized polymeric composition may also optionally comprise one or more additives to impart desired physical properties, such as printability, increased gloss, or a reduced blocking tendency of articles formed from a compatibilized polymeric composition described herein. Examples of additives may include without limitation, stabilizers, ultra-violet screening agents, oxidants, anti-oxidants, anti-static agents, ultraviolet light absorbents, fire retardants, processing oils, mold release agents, coloring agents, pigments/dyes, fillers, and/or other suitable additives. The aforementioned additives may be used either singularly or in combination to form various formulations of the polymer. For example, in the fabrication of automotive parts, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to the compatibilized polymeric compositions may be determined by one skilled in the art with the aid of this disclosure.

In an embodiment, the compatibilized polymeric composition may also optionally comprise one or more inorganic fillers to increase the flexural modulus and tensile mechanical properties of articles formed from a compatibilized polymeric composition described herein. Incorporating one or more inorganic fillers may also increase properties such as the heat distortion temperature and scratch resistance, for example, of articles formed from a compatibilized polymeric composition described herein. Suitable inorganic fillers include talc, carbon black, limestone, marble, ceramic, and other common inorganic fillers known to one of skill in the art. For example, the addition of talc to the compatibilized polymeric composition provides an article formed from that composition with improved scratch resistance.

In an embodiment, the compatibilized polymeric composition may include from about 1 wt. % to about 60 wt. %, or from about 5 wt. % to about 25 wt. %, or from about 10 wt. % to about 20 wt. % inorganic filler based on the total weight of the compatibilized polymeric composition, for example.

The compatibilized polymeric composition may be prepared by contacting the polyolefin, the polylactic acid, and the reactive modifier under conditions suitable for the formation of the compatibilized polymeric blend. The polyolefin, the polylactic acid, and the reactive modifier may be blended via a variety of methods such as melt blending, melt compounding, or combinations thereof, and by known blending techniques such as mixing and extrusion (e.g., twin-screw extrusion), for example.

In an embodiment, the compatibilized polymeric composition may be prepared by contacting a polypropylene heterophasic copolymer, PLA, and an epoxy-functionalized polyolefin (e.g., HGGMA) as the reactive modifier. In one example, the polypropylene heterophasic copolymer, PLA, and epoxy-functionalized polyolefin components may be dry blended, fed into an extruder, and melted inside the extruder. The mixing may be carried out using a continuous mixer such as a mixer having an intermeshing co-rotating twin screw extruder for mixing and melting the components of the compatibilized polymeric composition and a single screw extruder or a gear pump for pumping the molten mixture (i.e., compatibilized polymeric composition) out of the continuous mixer. The compatibilized polymeric composition may be subsequently dried in an oven or under vacuum.

Without wishing to be limited by theory, formation of a PP-epoxy-PLA grafted copolymer occurs upon reactive extrusion when at least a portion of the reactive modifier (i.e., epoxy functionalized polyolefin) which is originally associated with the PP migrates to the PP/PLA interface. The reactive modifier may contact the PLA molecules at the interface between the PP and PLA phases and react with the PLA to form PP-epoxy-PLA grafted copolymers at the interface. The PP-epoxy-PLA copolymer formed in situ is a compatibilizer that stabilizes the PP/PLA blend by performing multiple functions. In a molten state, the compatibilizer may decrease the interfacial tension between PP and PLA and improve dispersion of the PLA phase in the PP. Once the compatibilized polymeric composition solidifies, the compatibilizer remains at the interface of PP and PLA, where it may function to chemically interlink PP and PLA. Thus, the compatibilizers form an adhesive or tie layer that serves to improve the interfacial bonding resulting in compatibilized polymeric compositions having improved phase dispersions and properties when compared to an uncompatibilized PP/PLA blend.

Product Application

The compatibilized polymeric compositions and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

In an embodiment, the compatibilized polymeric composition is utilized in injection molding processes to form injection molded articles. The injection molded articles may include a wide variety of articles including automotive parts or structures (e.g., automotive dashboard), for example. The injection molded articles may be formed by any suitable injection molding process known to one of skill in the art. Injection molding processes generally include heating the compatibilized polymeric composition to form a molten polymer and subsequently forcing (i.e., injecting) the molten polymer into a mold cavity where the molten polymer fills the mold cavity thereby taking the desired shape of the mold cavity. Thereafter, the molten polymer inside the mold cavity cools and hardens to form a molded article which is subsequently ejected from the mold.

In one example, polypropylene heterophasic copolymer, PLA, and an epoxy-functionalized polyolefin reactive modifier (e.g., HGGMA) may be dry blended, fed into an extruder, and melted inside the extruder. The mixing may be carried out using a mixer having an intermeshing co-rotating twin screw extruder for mixing and melting the components into a compatibilized polymeric blend. The molten compatibilized polymeric blend may be fed to a manifold where it is injected through nozzles into mold cavities. In each mold cavity, the molten blend fills the mold cavity, thereby taking on a desired shape of the interior of the mold cavity. The molten blend in the desired shape of the article cools and hardens to form an injection molded article which is subsequently ejected from the mold. In one example, the injection molded article is an automotive part such as an interior automotive part, for example.

In an embodiment, the compatibilized polymeric composition may exhibit a melt flow rate (MFR) in a range from 0.5 dg/min. to 100 dg/min., or from 1 dg/min. to 50 dg/min., or from 5 dg/min. to 40 dg/min.

In an embodiment, the injection molded articles formed from a compatibilized polymeric composition of the type described herein exhibits a flexural modulus of at least 150 kpsi or in a range from 150 kpsi to 500 kpsi, as determined in accordance with ASTM D790. The stiffness of the injection molded article is reflected in the article's flexural modulus. The flexural modulus test in broad terms measures the force required to bend a sample material beam. The force is applied to the center of the sample beam, while the beam is supported on both ends.

In an embodiment, the injection molded articles formed from a compatibilized polymeric composition of the type described herein exhibits a tensile modulus of at least 170 kpsi or in a range from 170 kpsi to 400 kpsi, as determined in accordance with ASTM D638. The rigidity of the injection molded article is reflected in the article's tensile modulus. The tensile modulus is the ratio of stress to elastic strain in tension. Therefore, the larger the tensile modulus the more rigid the material, and the more stress required to produce a given amount of strain.

In an embodiment, the injection molded articles formed from a compatibilized polymeric composition of the type described herein exhibits a tensile yield strength of at least 2800 psi, or in a range from 2800 psi to 4500 psi, as determined in accordance with ASTM D882. The tensile strength at yield is the force per unit area required to yield a material.

In an embodiment, the injection molded articles formed from a compatibilized polymeric composition of the type described herein exhibits a notched Izod impact strength of at least 0.7 ft-lb/in, or in a range from 0.7 ft-lb/in to 15 ft-lb/in, or in a range from 2.1 ft-lb/in to 15 ft-lb/in, or in a range from 3 ft-lb/in to 15 ft-lb/in, as determined in accordance with ASTM D256. Izod impact is defined as the kinetic energy needed to initiate a fracture in a polymer sample specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promote a brittle rather than ductile fracture. Specifically, the Izod impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy, etc.).

In an embodiment, the injection molded articles formed from a compatibilized polymeric composition of the type described herein exhibits a heat distortion temperature of greater than 70° C., or in a range from 70° C. to 125° C., as determined in accordance with ASTM D648.

Typically the addition of PLA to a PP will increase the stiffness and concomitantly decrease the impact strength of an injection molded article, as compared to the stiffness and impact strengths of an injection molded article formed from the PP. In contrast, the end-use injection molded articles formed from the compatibilized polymeric blends of the present invention may advantageously provide both improved stiffness (i.e., tensile modulus and flexural modulus) and impact strength (i.e., notched Izod impact strength) properties to the injection molded article, as compared to injection molded articles formed from conventional compatibilized PP/PLA blends. This improved balance in stiffness and impact properties of articles formed from the compatibilized polymeric compositions described herein advantageously permit a wider range of utility of these compositions in the fabrication of injection molded articles requiring both stiffness and impact strength.

In an embodiment, an injection molded article formed from a compatibilized polymeric composition of the type described herein is an automotive part. The automotive part may be an interior or exterior part or structure of an automobile. Utilization of the compatibilized polymeric compositions described herein to form injection molded automotive parts advantageously provides automobile manufacturers with parts that be used to substitute parts traditionally made from metal, thereby permitting the fabrication of lighter more fuel efficient (i.e., eco-friendly) automobiles.

EXAMPLES

The following example is given as particular embodiments of the disclosure and to demonstrate the practice and advantages thereof. It is understood that the example is given by way of illustration and is not intended to limit the specification or the claims to follow in any manner.

Example 1

The first example demonstrates the effect of various reactive modifiers on the mechanical properties of polymeric blends comprising polypropylene heterophasic copolymer (PPHC) as the base polymer, PLA and a reactive modifier. For comparison purposes, the first sample (Sample 1) is a polypropylene heterophasic copolymer ("PPHC") commercially available as neat Total Petrochemicals 4820WZ ("4820WZ") having 9 wt. % ethylene based on the total weight of the PPHC, referred to herein as the PPHC reference sample. Also for comparison purposes, the second sample (Sample 2) is a blend of PPHC 4820WZ and a polylactic acid polymer commercially available as NatureWorks® PLA Polymer 3251D ("3251D"), referred to herein as PPHC/PLA blend, wherein the PPHC is present in a concentration of about 95 wt. % and the PLA has a concentration of about 5 wt. % based on the total weight of the blend. The remaining samples (i.e., Sample 3 through Sample 8) consist of a blend of 93 wt. % PPHC 4820WZ, 5 wt. % PLA 3251, and 2 wt. % of a reactive modifier. The reactive modifier incorporated into the third sample (Sample 3) blend is PP-g-Nylon 6, which was fabricated but is also commercially widely available. The reactive modifier incorporated into the fourth sample (Sample 4) blend is highly grafted PP-g-GMA ("HGGMA") produced as previously described in the above disclosure. The reactive modifier incorporated into the fifth sample (Sample 5) blend is Lotader® AX8840, which is a random copolymer of PE-co-GMA which is commercially available from Arkema. The reactive modifier incorporated into the sixth sample (Sample 6) blend is Polybond® 3150, which is a maleic anhydride grafted propylene containing about 0.5 wt. % maleic anhydride commercially available from Chemtura. The reactive modifier incorporated into the seventh sample (Sample 7) blend is EMAC® Plus SP1307, which is a 20% ethylene-methyl acrylate (EMA) block copolymer commercially available from Westlake Chemical Corporation. The reactive modifier incorporated into the eighth sample (Sample 8) blend is Kraton® G1643 M, which is a linear triblock copolymer based on styrene and ethylene/butylenes (SEBS) having a styrene content of 20% and commercially available from Kraton Performance Polymers, Inc. The formulations of each of the samples (Samples 1-8) were melt blended using a Leistritz 27 mm twin-screw extruder. The eight samples were extruded, pelletized, and then injection molded into standard bar specimens and ⅛ inch plaques for mechanical testing. The formulations, MFR, and mechanical properties of Samples 1-8 are summarized in Table 1.

TABLE 1

|  | Sample 1 | Sample 2 | Sample 3 | Sample 4 |
| --- | --- | --- | --- | --- |
| Blend |  |  |  |  |
| PPHC | 4820WZ | 4820WZ | 4820WZ | 4820WZ |
| wt. % PPHC | 100 wt. % | 95 wt. % | 93 wt. % | 93 wt. % |
| 5 wt. % PLA | — | 3251D | 3251D | 3251D |
| 2 wt. % modifier | — | — | PP-g-Nylon 6 | HGGMA |
| Properties |  |  |  |  |
| MFR [dg/min.] | 33.9 | 39.7 | 34.6 | 35.5 |
| Flexural modulus [kpsi] | 197 | 230 | 229 | 231 |
| Tensile modulus [kpsi] | 212 | 233 | 235 | 233 |
| Tensile yield strength [psi] | 3682 | 3715 | 3772 | 3785 |
| Tensile elongation at yield [%] | 3.8 | 3.1 | 3.1 | 3.0 |
| Tensile strength at break [psi] | 2488 | 2675 | 2924 | 2780 |
| Tensile elongation at break [%] | 30 | 23 | 19 | 22 |
| Izod Impact-Notched [ft-lb/in] | 1.02 | 1.2 | 1.11 | 1.12 |
|  | Sample 5 | Sample 6 | Sample 7 | Sample 8 |
| Blend |  |  |  |  |
| PPHC | 4820WZ | 4820WZ | 4820WZ | 4820WZ |
| wt. % PPHC | 93 wt. % | 93 wt. % | 93 wt. % | 93 wt. % |
| 5 wt. % PLA | 3251D | 3251D | 3251D | 3251D |
| 2 wt. % modifier | Lotader AX8840 | Polybond 3150 | EMAC SP1307 | Kraton G1643M |
| Properties |  |  |  |  |
| MFR [dg/min.] | 34.3 | 36 | 32.6 | 35.3 |
| Flexural modulus [kpsi] | 200 | 210 | 209 | 180 |
| Tensile modulus [kpsi] | 219 | 235 | 224 | 188 |
| Tensile yield strength [psi] | 3580 | 3827 | 3563 | 3355 |
| Tensile elongation at yield [%] | 3.1 | 3.1 | 3.1 | 4.1 |
| Tensile strength at break [psi] | 2567 | 2792 | 2728 | 2295 |
| Tensile elongation at break [%] | 29 | 23 | 23 | 32 |
| Izod Impact-Notched [ft-lb/in] | 1.33 | 1.21 | 1.24 | 1.61 |

The data in Table 1 shows that only a small amount of PLA (i.e., 5 wt. %) in the blend of Sample 2 can significantly increase the stiffness of the PPHC polymer (Sample 1) as reflected in about a 17% increase in flexural modulus (i.e., from 197 kpsi to 230 kpsi) and about a 10% increase in tensile modulus (i.e., from 212 kpsi to 233 kpsi). Sample 3 through 8 demonstrate that the addition of 2% various reactive modifiers can be utilized to further tweak or vary the stiffness and impact values of the PPHC/PLA blends, depending upon the stiffness and impact values required for the particular application of an injection molded article. FIG. 1 is a plot of impact strengths as a function of flexural modulus for each of samples. For injection molding article applications that require both high impact and high flexural modulus, a comparison of Samples 3 through 8, as compared to reference Samples 1 and 2, demonstrates that the blends of Sample 3 (formulated using PP-g-Nylon 6 as the reactive modifier) and Sample 4 (formulated using HGGMA as the reactive modifier) have the best overall balance of mechanical properties (e.g., flexural modulus, tensile modulus, and notched Izod impact strength). However, it is noted that the reactive modifier in Sample 3 causes a some discoloration of the polymer in terms of an increase in yellowing where Y1 is equal to 18.55 (as determined by ASTM D1925) and in Color b where Color b is equal to 8.33, whereas Sample 4 exhibits a Y1 equal to 4.96 and Color b equal to 2.7.

Example 2

In an effort to achieve superior stiffness/impact balance of PP/PLA blends, the second example demonstrates the effect of higher ethylene content polypropylene heterophasic copolymer as the base polymer and higher concentrations of both PLA and reactive modifier (as compared to the samples prepared in the previous first example) on the mechanical and thermophysical properties of polymeric blends comprising PPHC, PLA and a reactive modifier. For comparison purposes, the ninth sample (Sample 9) is a polypropylene heterophasic copolymer ("PPHC") commercially available as Total Petrochemicals 5571 ("5571") having 11 wt. % ethylene based on the total weight of the PPHC, referred to herein as the PPHC reference sample. Also for comparison purposes, the tenth sample (Sample 10) is a blend of PPHC 5571 and a polylactic acid polymer commercially available as NatureWorks® PLA Polymer 6202D ("6202D"), referred to herein as the PPHC/PLA blend, wherein the concentrations of PPHC and PLA are about 90 wt. % and 10 wt. %, respectively, based on the total weight of the blend. The eleventh sample (Sample 11) is a blend of 85 wt. % PPHC 5571, 10 wt. % PLA 6202D, and 5 wt. % highly grafted PP-g-GMA ("HGGMA") as the reactive modifier. The HGGMA reactive modifier was produced as previously described in the above disclosure. The twelfth sample (Sample 12) is a blend of 85 wt. % PPHC 5571, 10 wt. % PLA 6202D, and 5 wt. % Lotader® AX8840 as the reactive modifier. As previously mentioned, Lotader® AX8840 which is a random copolymer of PE-co-GMA commercially available from Arkema. The formulations of each of the samples (Samples 9-12) were melt blended using a Leistritz 27 mm twin-screw extruder. The four samples were extruded, pelletized, and then injection molded into standard bar specimens and ⅛ inch plaques for mechanical testing. The formulations, MFR, and mechanical properties of Samples 9-12 are summarized in Table 2.

TABLE 2

|  | Sample 9 | Sample 10 | Sample 11 | Sample 12 |
|---|---|---|---|---|
| Blend |  |  |  |  |
| PPHC | 5571 | 5571 | 5571 | 5571 |
| wt. % PPHC | 100 wt. % | 90 wt. % | 85 wt. % | 85 wt. % |
| 10 wt. % PLA | — | 6202D | 6202D | 6202D |
| 5 wt. % modifier | — | — | HGGMA | Lotader AX8840 |
| Properties |  |  |  |  |
| MFR [dg/min.] | 7.0 | 10.0 | 10.8 | 7.0 |
| Flexural modulus [kpsi] | 182 ± 4 | 215 ± 7 | 220 ± 4 | 212 ± 4 |
| Tensile modulus [kpsi] | 183 ± 1.5 | 217 ± 1.0 | 223 ± 0.6 | 207 ± 1.8 |
| Tensile yield strength [psi] | 3446 ± 27 | 3674 ± 6 | 3789 ± 11 | 3551 ± 21 |
| Tensile elongation at yield [%] | 5.0 | 3.3 | 3.4 | 3.5 |
| Tensile strength at break [psi] | 2353 ± 125 | 2071 ± 126 | 2212 ± 65 | 1801 ± 328 |
| Tensile elongation at break [%] | 63 ± 3.1 | 27 ± 4.6 | 27 ± 2.0 | 29 ± 4.5 |
| Izod Impact-Notched [ft-lb/in] | 2.05 | 1.62 | 1.52 | 1.96 |
| HDT [° C.] | 86.1 | 91.1 | 92.8 | 83.3 |

The data in Table 2 shows that 10 wt. % PLA in the blend of Sample 10 significantly increases the stiffness of the PPHC polymer (Sample 9) by approximately 18%, as reflected in the increases in both the flexural modulus (i.e., from 182 kpsi to 215 kpsi) and tensile modulus (i.e., from 183 kpsi to 217 kpsi), and increases the tensile yield strength by nearly 7% and the heat distortion temperature (HDT) by 5° C. The blend of Sample 11 shows that the incorporation of HGGMA as the reactive modifier can further increase these properties (i.e., flexural modulus, tensile modulus, tensile yield strength, and HDT), which indicates that the efficiency of using PLA to modify polypropylene was further improved upon compatibilization. In contrast, the blend of Sample 12 exhibits a decrease in these properties (i.e., flexural modulus, tensile modulus, tensile yield strength, and HDT) which indicates that the reactive modifier Lotader® AX8840 did not perform as effectively as the reactive modifier (HGGMA) in Sample 11 in terms of increasing material stiffness. With respect to impact strength, using PPHC 5571 with higher ethylene content of 11 wt. % increases the impact strength, as compared to the impact strength of the PPHC 4820WZ utilized in the previous first example having an ethylene content of 9 wt. %. However, as expected, the incorporation of PLA into Samples 10, 11, and 12 moderately lowered the impact strength of the PPHC (Sample 9). In conclusion, the PPHC/PLA blend compatibilized with HGGMA (i.e., Sample 11) resulted in more balanced mechanical and thermophysical properties.

Example 3

In an effort to further increase the impact strength of PP/PLA blends without sacrificing stiffness, the third example demonstrates the effect of higher ethylene content polypropylene heterophasic copolymer as the base polymer (as compared to the samples prepared in the previous first and second examples) and several different concentrations of PLA and reactive modifier on the mechanical and thermophysical properties of polymeric blends comprising PPHC, PLA, and highly grafted PP-g-GMA ("HGGMA") as the reactive modifier. For comparison purposes, the thirteenth sample (Sample 13) is a polypropylene heterophasic copolymer ("PPHC") commercially available as Total Petrochemicals 7810 ("7810") having 13.5 wt. % ethylene based on the total weight of the PPHC, referred to herein as the PPHC reference sample. Also for comparison purposes, the fourteenth sample (Sample 14) is a blend of PPHC 7810 and a polylactic acid polymer commercially available as NatureWorks® PLA Polymer 6202D ("6202D"), referred to herein as the PPHC/PLA blend, wherein the concentrations of PPHC and PLA are about 90 wt. % and 10 wt. %, respectively, based on the total weight of the blend. The fifteenth sample (Sample 15) is a blend of 85 wt. % PPHC 7810, 10 wt. % PLA 6202D, and 5 wt. % HGGMA as the reactive modifier. The HGGMA reactive modifier was produced as previously described in the above disclosure. The sixteenth sample (Sample 16) is a blend of 92 wt. % PPHC 7810, 5 wt. % PLA 6202D, and 3 wt. % HGGMA. The seventeenth sample (Sample 17) is a blend of 75 wt. % PPHC 7810, 20 wt. % PLA 6202D, and 5 wt. % HGGMA. Also for comparison purposes, the eighteenth sample (Sample 18) comprises another polypropylene heterophasic copolymer commercially available as Total Petrochemicals 9760 ("9760") having 8 wt. % ethylene based on the total weight of the PPHC. Sample 18 is a blend of 85 wt. % PPHC 9760, 10 wt. % PLA 6202D, and 5 wt. % HGGMA. The formulations of each of the samples (Samples 13-18) were melt blended using a Leistritz 27 mm twin-screw extruder. The six samples were extruded, pelletized, and then injection molded into standard bar specimens and ⅛ inch plaques for mechanical testing. The formulations, MFR, and mechanical properties of Samples 13-18 are summarized in Table 3.

TABLE 3

| | Sample 13 | Sample 14 | Sample 15 | Sample 16 | Sample 17 | Sample 18 |
|---|---|---|---|---|---|---|
| Blend | | | | | | |
| PPHC 7810 | 100 wt. % | 90 wt. % | 85 wt. % | 92 wt. % | 75 wt. % | — |
| PPHC 9760 | — | — | — | — | — | 85 wt. % |
| PLA 6202D | — | 10 wt. % | 10 wt. % | 5 wt. % | 20 wt. % | 10 wt. % |
| HGGMA | — | — | 5 wt. % | 3 wt. % | 5 wt. % | 5 wt. % |
| Properties | | | | | | |
| MFR [dg/min.] | 13.4 | 12.8 | 12.2 | 12.1 | 15.2 | 26.3 |
| Density [g/cm$^3$] | 0.8956 | 0.9215 | 0.9251 | 0.9086 | 0.9513 | 09291 |
| Flexural modulus [kpsi] | 148 ± 1 | 182 ± 1 | 187 ± 5 | 170 ± 4 | 214 ± 2 | 258 ± 3 |
| Tensile tests | | | | | | |
| Modulus [kpsi] | 161 ± 1 | 183 ± 2 | 192 ± 2 | 176 ± 2 | 213 ± 1 | 248 ± 1 |
| Yield strength [psi] | 2882 ± 12 | 3045 ± 31 | 3171 ± 29 | 2952 ± 34 | 3594 ± 23 | 4032 ± 35 |
| Elongation at yield [%] | 4.6 | 3.4 | 3.3 | 3.8 | 2.9 | 2.9 |
| Strength at break [psi] | 2415 | 1992 | 2232 | 2363 | 2323 | 2606 |
| Elongation at break [%] | 250 ± 5 | 29 ± 3 | 34 ± 4 | 180 ± 9 | 14 ± 1 | 14 ± 1 |
| Izod Impact-Notched [ft-lb/in] | 11.82 | 8.99 | 3.39 | 12.15 | 1.31 | 0.79 |
| HDT [° C.] | 86.1 | 73.3 | 78.3 | 82.8 | 70.6 | 96.7 |

The data in Table 3 shows that shows 10 wt. % PLA in the blend of Sample 14 significantly increases the stiffness of the PPHC polymer (Sample 13) as reflected in about a 23% increase in flexural modulus (i.e., from 148 kpsi to 182 kpsi) and about a 14% increase in tensile modulus (i.e., from 161 kpsi to 183 kpsi). The blend of Sample 15 shows that the incorporation of HGGMA as the reactive modifier can further increase stiffness (i.e., flexural modulus and tensile modulus), which indicates that the efficiency of using PLA to modify polypropylene was further improved upon compatibilization. The blend of Sample 15 also shows higher tensile strengths (i.e., tensile yield strength and tensile break strength) and slightly higher tensile elongation at break, as compared to Sample 14, which indicates that the use of HGGMA as the reactive modifier increases the material toughness. Even though the PLA dispersed better upon compatibilization in Sample 15, the impact strength of the material decreased to 3.39 ft-lb/in. However, it is notable that the notched Izod impact resistance of Sample 15 was still greater than 3 ft-lb/in. As expected, Sample 16 shows that a decrease in PLA concentration (i.e., 5 wt. % PLA) decreases the material stiffness. Conversely, Sample 17 shows that an increase in PLA concentration (i.e., 20 wt. % PLA) increases stiffness. It is notable that the blend of Sample 16 exhibited an increase in impact strength, as compared to Sample 14, and is comparable to the notched Izod impact strength of the reference Sample 13. A comparison of Sample 15 and Sample 18 demonstrates that the use of a lower ethylene content (8 wt. %) polypropylene heterophasic copolymer (PPHC 9760) can substantially increase a material's stiffness and concomitantly decrease its impact strength. In conclusion, the PPHC/PLA blend compatibilized with HGGMA (i.e., Sample 11) resulted in more balanced stiffness and impact properties which may be required in certain applications, such as injection molding of automotive parts, for example. Compatibilized polymeric blends (comprising biodegradable PLA) that exhibit a better balance in stiffness and impact properties may be advantageously utilized as bio-sourced materials that provide a more eco-friendly alternative to metal in the fabrication of automotive parts.

With respect to heat distortion temperature (HDT), the addition of PLA did not increase the HDT, as was observed in Samples 9 and 10 in the previous second example. It is believed that this result is probably due to PLA not fully crystallizing in the base polymer PPHC 7810 due to certain variations in processing conditions. However, the use of HGGMA as a reactive modifier in Samples 15 and 16 did increase the HDT of PPHC 7810 (as was also observed in Sample 11 as compared to Sample 10 in the previous second example). The lower HDT value of Sample 17 may be the result of too small a concentration of HGGMA relative to the high concentration of PLA in the feedstock of this blend. Thus, the HGGMA reactive modifier increases the HDT of PPHC/PLA blends, as compared to non-compatibilized PPHC/PLA blends, which improves the thermophysical properties of polymeric blends comprising PPHC, PLA, and highly grafted PP-g-GMA ("HGGMA") as the reactive modifier.

Example 4

The fourth example demonstrates the effect of adding PLA and highly grafted PP-g-GMA ("HGGMA") as the reactive modifier on the mechanical properties of commercially available polymeric blends comprising PPHC and inorganic filler (i.e., talc). The nineteenth sample (Sample 19) is a non-biodegradable polymeric blend as EBP-830 from Total Petrochemicals (Feluy) that may be utilized for constructing interior automotive parts. EBP-830 is a polymer blend of 60 wt. % polypropylene heterophasic copolymer PPHC 9760 (ethylene content of 8 wt. %), 10 wt. % ethylene propylene diene monomer (EPDM), and 30 wt. % talc as the inorganic filler. The incorporation of EPDM into the blend may provide additional impact resistance to the blend and, in effect, compensate for the low rubber content (8 wt. % $C_2$) of PPHC 9760. The twentieth sample (Sample 20) is a blend of 85 wt. % EBP-830, 10 wt. % polylactic acid polymer PLA 6202D, and 5 wt %. HGGMA which provides a compatibilized blend of 51 wt. % PPHC 9760, 8.5 wt. % EPDM, 25.5 wt. % talc, 10 wt. % PLA 6202D, and 5 wt %. HGGMA. The twenty-first sample (Sample 21) is a non-biodegradable polymer blend as SR-64 from Total Petrochemicals which is a polymer blend of 30 wt. % polypropylene heterophasic copolymer PPHC 9760, 38 wt. % polypropylene heterophasic copolymer PPHC 7810 (ethylene content of 13.5 wt. %), 10 wt. % high density polyethylene (HDPE) which is commercially available as product M6091 ("M6091") from Total Petrochemicals, 15% talc steamic OOS which is commercially available at Luzenac, and 7% Tafmer A1050S which is commercially available at Mitsui. The incorporation of HDPE into the blend may provide some additional impact resistance and scratch resistance of the polymeric blend while maintaining the stiffness of the blend. The twenty-second sample (Sample 22) adds PLA 6202D and HGGMA to the composition of Sample 21, to provide a compatibilized blend of 25.5 wt. % PPHC 9760, 32.3 wt. % PPHC 7810, 5.95 wt. % HDPE M6091, 5.95% EPDM, and 12.75 wt. % talc, 10 wt. % PLA 6202D, and 5 wt %. HGGMA. The formulations of each of the samples (Samples 19-22) were melt blended using a Leistritz 27 mm twin-screw extruder. The four samples were extruded, pelletized, and then injection molded into standard bar specimens and ⅛ inch plaques for mechanical testing. The formulations, MFR, and mechanical properties of Samples 19-22 are summarized in Table 4.

TABLE 4

|  | Sample 19 | Sample 20 | Sample 21 | Sample 22 |
|---|---|---|---|---|
| Blend |  |  |  |  |
| PPHC 9760 (8 wt. % C2) | 60 wt. % | 51 wt. % | 30 wt. % | 25.5 wt. % |
| PPHC 7810 (13.5 wt. % C2) | — | — | 38 wt. % | 32.3 wt. % |
| EPDM | 10 wt. % | 8.5 wt. % | 7 wt % | 5.95 wt % |
| HDPE M6091 | — | — | 10 wt. % | 8.50 wt. % |
| talc | 30 wt. % | 25.5 wt. % | 15 wt. % | 12.75 wt. % |
| PLA 6202D | — | 10 wt. % | — | 10 wt. % |
| HGGMA | — | 5 wt. % | — | 5 wt. % |
| Properties |  |  |  |  |
| MFR [dg/min.] | 11.6 | 10.0 | 7.4 | 9.2 |
| Density [g/cm$^3$] | 1.0929 | 1.1145 | 0.9827 | 1.0163 |
| Flexural modulus [kpsi] | 459 | 491 | 203 | 240 |
| Tensile tests |  |  |  |  |
| Modulus [kpsi] | 293 | 367 | 205 | 247 |
| Yield strength [psi] | 3404 | 3902 | 3025 | 3391 |
| Elongation at yield [%] | 2.2 | 1.7 | 5.0 | 3.1 |
| Strength at break [psi] | 2303 | 3228 | 2076 | 2415 |
| Elongation at break [%] | 21 | 8 | 60 | 25 |
| Izod Impact-Notched [ft-lb/in] | 2.73 | 0.71 | 10.7 | 1.82 |
| HDT [° C.] | 124 | 119 | 92 | 84 |

The data in Table 4 shows that compatibilization of PLA with highly grafted PP-g-GMA in the blend of Sample 20 increases the stiffness and tensile mechanical properties of the Sample 19 blend as reflected by a 7% increase in flexural modulus, a 25% increase in tensile modulus, a 15% increase in tensile yield strength, and a 40% increase in the tensile break strength. While the increases in tensile mechanical properties are substantial, there is also a decrease in the notched Izod impact strength and HDT temperature. Similar results were obtained in Sample 22. In particular, compatibilization of PLA with highly grafted PP-g-GMA in the blend of Sample 22 increases the stiffness and tensile mechanical properties of the Sample 21 blend as reflected by an 18% increase in flexural modulus, a 21% increase in tensile modulus, a 12% increase in tensile yield strength, and a 16% increase in the tensile break strength. Thus, the flexural and tensile mechanical properties of the EBP-830 and SR-64 formulations comprising inorganic filler may be further enhanced by the incorporation of PLA and HGGMA.

Example 5

The fifth example demonstrates the effect of adding PLA and highly grafted PP-g-GMA ("HGGMA") as the reactive modifier on the high temperature mechanical properties of heterophasic propylene copolymers. For comparison purposes, the twenty-third sample (Sample 23) is a polypropylene heterophasic copolymer ("PPHC") commercially available as Total Petrochemicals 5571 ("5571") having 11 wt. % ethylene based on the total weight of the PPHC. Also for comparison purposes, the twenty-fourth sample (Sample 24) is a blend of PPHC 5571 and a polylactic acid polymer commercially available as NatureWorks® PLA Polymer 6202D ("6202D"), referred to herein as the PPHC/PLA blend, wherein the concentrations of PPHC and PLA are about 90 wt. % and 10 wt. %, respectively, based on the total weight of the blend. The twenty-fifth sample (Sample 25) is a blend of 85 wt. % PPHC 5571, 10 wt. % PLA 6202D, and 5 wt. % highly grafted PP-g-GMA ("HGGMA") as the reactive modifier. The HGGMA reactive modifier was produced as previously described in the above disclosure. The twenty-sixth sample (Sample 26) is a blend of 75 wt. % PPHC 5571, 20 wt. % PLA 6202D, and 5 wt. % highly grafted PP-g-GMA ("HGGMA") as the reactive modifier. The four samples were extruded, pelletized, and then injection molded into standard bar specimens for mechanical testing. The mechanical properties of Samples 23-26 at 23° C., 50° C. and 80° C. are summarized in FIGS. 2 and 3

Figure 2:
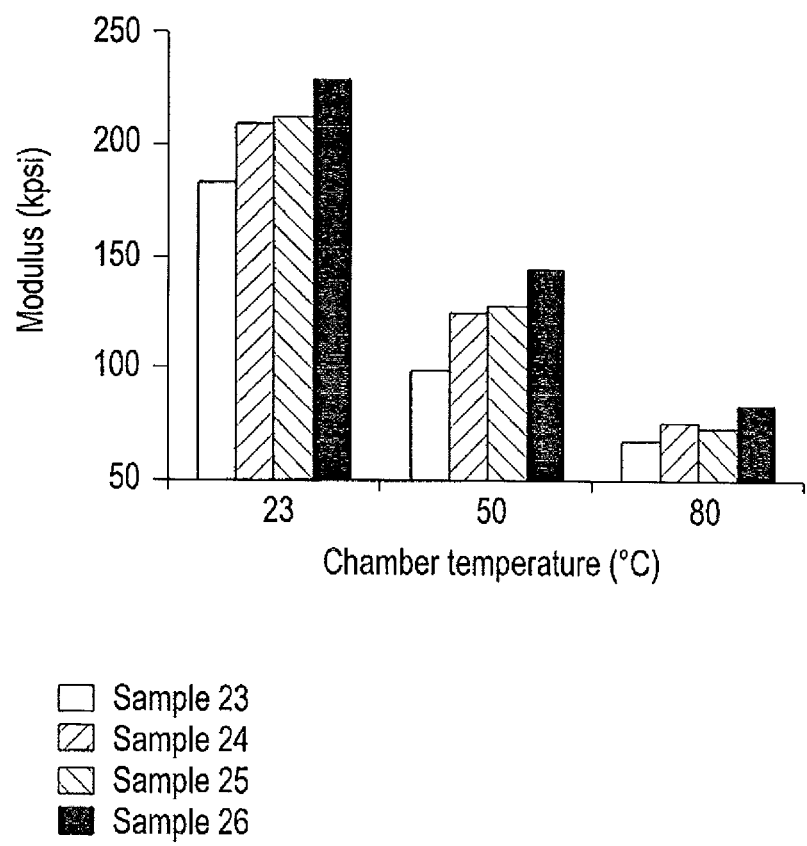
FIG. 2 shows the tensile modulus of various polymer samples tested at different temperatures.
Figure 3:
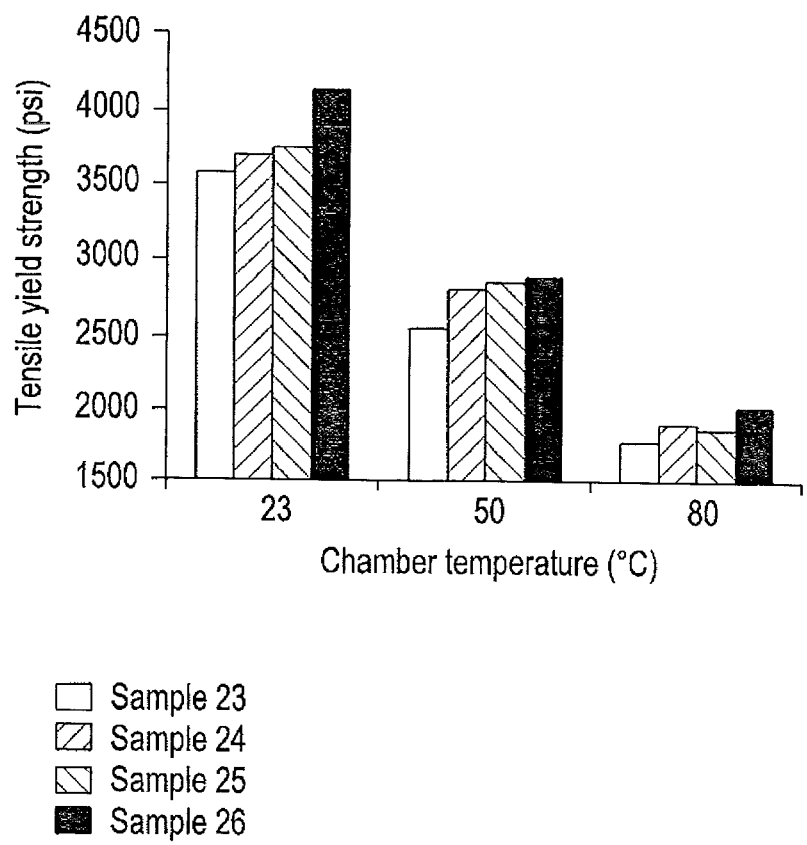
FIG. 3 shows the tensile yield strengths of various polymer samples tested at different temperatures.

The data in FIGS. 2 and 3 show that, as expected, materials Young's modulus and tensile yield strengths decrease as the testing temperature increases. Addition of 10 wt. % PLA in the blend of Sample 24 significantly increases the stiffness and tensile strengths of the PPHC polymer (Sample 23), whichever test temperature is used. The blend of Sample 25 shows that the incorporation of HGGMA as the reactive modifier can further increase the Young's modulus and strength, even though a slightly lower stiffness is obtained at 80° C. Addition of 20% PLA in the blend of Sample 26 can further improve mechanical properties at different temperatures. Overall, presence of PLA does not have any noticeable detrimental effect on material tensile mechanical properties even at high temperatures.

Example 6

The sixth example demonstrates the effect of thermal aging on the mechanical properties of heterophasic propylene copolymer-based materials. The four samples in the Example 5 were extruded, pelletized, and then injection molded into standard bar specimens. The specimens were then aged at 100° C. and 150° C. for a number of days. Then the specimens were taken out of the aging oven and tested for tensile mechanical properties at room temperature. The mechanical properties of the specimens aged at 100° C. are summarized in FIGS. 4 and 5, and a picture of the specimens aged at 150° C. for 30 days are summarized in FIG. 6.

Figure 4:
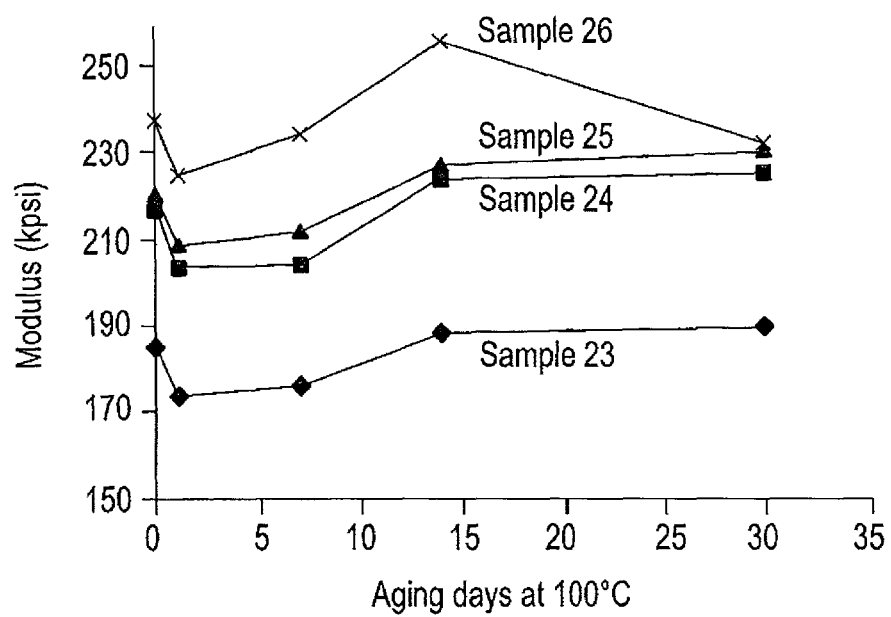
FIG. 4 shows the room temperature tensile modulus of various polymer samples after being aged at 100° C. for different days.

The data in FIG. 4 show that the Samples #24 through 26 containing PLA with or without reactive modifier possess higher stiffness than Sample #23 neat PPHC 5571 upon thermal aging at 100° C. for different times. Specifically, under each aging condition, presence of PLA in Sample 24 significantly increases stiffness of the heterophasic copolymer Sample 23, The blend of Sample 25 shows that the incorporation of HGGMA as the reactive modifier can further increase the stiffness, which indicates that the efficiency of using PLA to modify polypropylene was further improved upon compatibilization. The blend of Sample 25 shows that addition of more PLA 20 wt % can further significantly increase the stiffness, even though the stiffness drops when the sample was aged at 100° C. for about 30 days.

Figure 5:
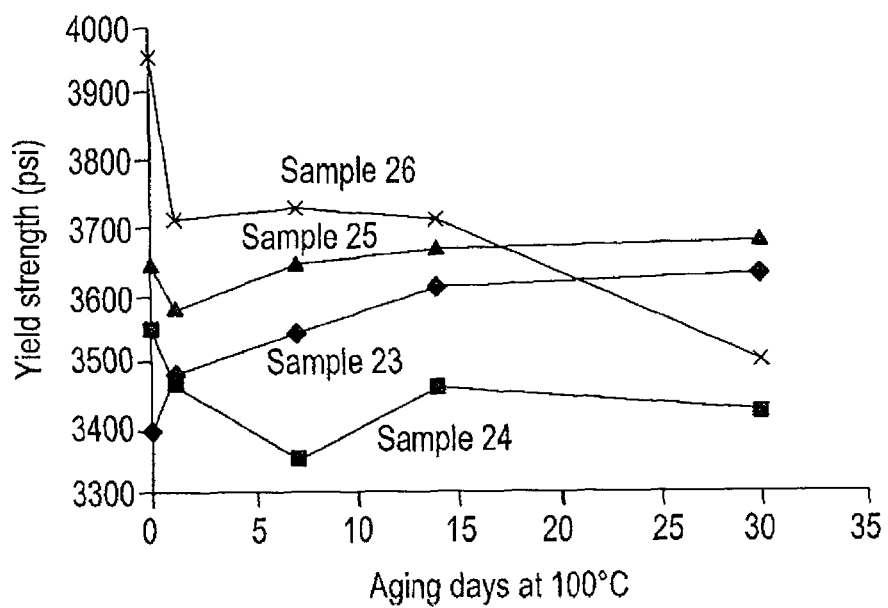
FIG. 5 shows the room temperature tensile yield strengths of various polymer samples after being aged at 100° C. for different days.
Figure 6:
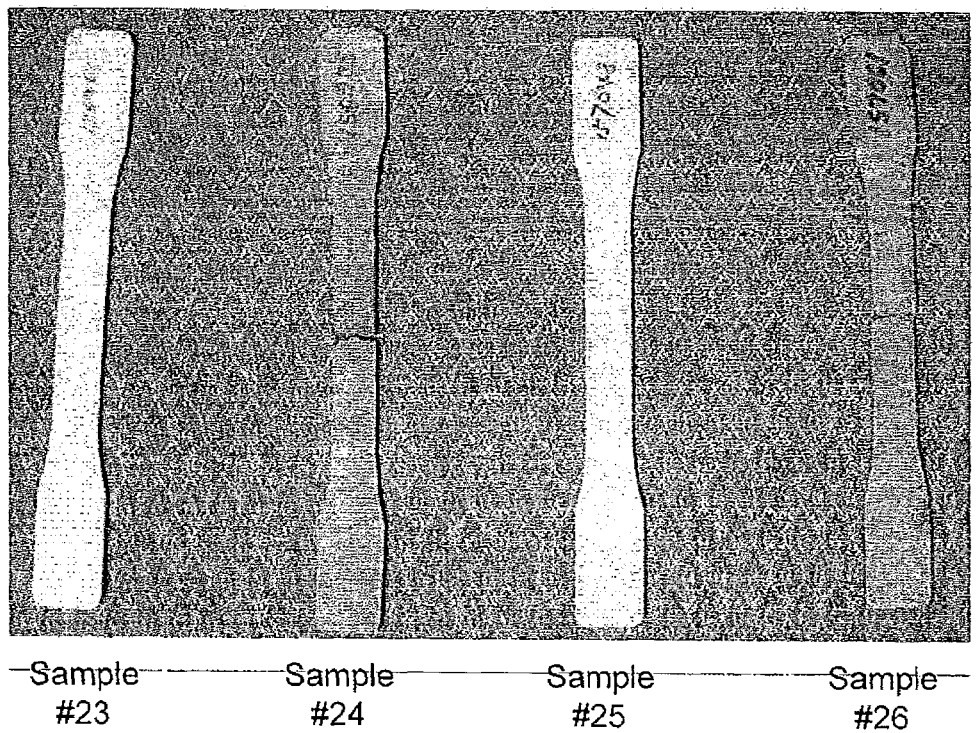
FIG. 6 shows a picture of various injection molded polymer specimens after being aged at 150° C. for about 30 days.

The data in FIG. 5 show that the effect of thermal aging on tensile yield strengths of the samples is different from sample to sample. In comparison with neat PPHC 5571 Sample 24, simple blend of PPHC 5571 and PLA shows lower tensile strengths upon thermal aging. However, when compatibilizer HGGMA is used, the materials become more stable, exhibiting increased tensile strength upon thermal aging, retaining superior yield strengths over neat PPHC 5571 Sample 23 under all the aging conditions. FIG. 6 shows the pictures of the Samples 23 through 26 after being aged at 150° C. for one month. Simple PPHC 5571 blend with PLA Sample 24 become brown color and very weak with no strength at all. However, with same amount of PLA content, the compatibilized Sample 25 still possesses its integrity and strength under the same conditions. Without being limited by any theory, it is speculated that use of HGGMA reactive modifier could consume the acid groups of PLA molecules and may also extend PLA molecular chains, making the PLA more thermally stable. Overall, in general presence of PLA does not have significantly detrimental effect on material tensile mechanical properties upon thermal aging. Compatibilization could significantly improve thermal stability of polyolefin-PLA blend materials.

While the foregoing is directed to embodiments of the present invention, other and further embodiments of the invention may be devised without departing from the basic scope thereof and the scope thereof is determined by the claims that follow.

What is claimed is:

1. A method comprising:
   providing a polyolefin comprising one or more propylene heterophasic copolymers, the polyolefin having an ethylene content of at least 10 wt. % based on the total weight of the polyolefin; and
   melt blending the polyolefin with a polylactic acid and a reactive modifier to form a compatiblized polymeric blend, wherein the reactive modifier comprises a glycidyl methacrylate grafted polypropylene (PP-g-GMA) that is produced by contacting a polypropylene, a glycidyl methacrylate, a multifunctional acrylate comonomer, and an initiator to form the PP-g-GMA having a grafting yield in a range from 1 wt. % to 15 wt. %.

2. The method according to claim 1, wherein the one or more propylene heterophasic copolymers has an average ethylene content in a range from 11.5 wt. % to 18 wt. % based on the total weight of the copolymers.

3. The method according to claim 1, wherein the polyolefin further comprises an elastomer comprising ethylene.

4. The method according to claim 1, wherein the polyolefin further comprises polyethylene.

5. The method according to claim 1, wherein the grafting yield of glycidyl methacrylate (GMA) from 1.5 wt. % to 15 wt. %.

6. The method according to claim 1, wherein the grafting yield of glycidyl methacrylate (GMA) is in a range from about 2 wt. % to about 15 wt. %.

7. The method according to claim 1, wherein the grafting yield of glycidyl methacrylate (GMA) is from 1.5 wt. % to 10 wt. %.

8. The method according to claim 1, wherein the multifunctional acrylate comonomer is selected from polyethylene glycol diacrylate, alkoxylated hexanediol diacrylate, trimethylolpropane triacrylate, propoxylated neopentyl glycol diacrylate, ethoxylated trimethylolpropane triacrylate, diethylene glycol diacrylate, tris(2-hydroxyethyl)isocyanurate triacrylate, and combinations thereof.

9. The method according to claim 1, wherein the PP-g-GMA is produced by contacting from 80 wt. % to 99.5 wt. % of the polypropylene, from 0.5 wt. % to 20 wt. % of the glycidyl methacrylate, from 0.5 wt. % to 15 wt. % of the multifunctional acrylate comonomer, and from 0.05 wt. % to 1.5 wt. % of the initiator under conditions suitable for the formation of the PP-g-GMA.

10. The method according to claim 1, wherein the melt blending step includes melt blending the polyolefin with the polylactic acid, an inorganic filler, and the reactive modifier to form the compatiblized polymeric blend.

11. A method comprising:
    contacting a polypropylene, a glycidyl methacrylate, a multifunctional acrylate comonomer, and an initiator to form glycidyl methacrylate grafted polypropylene (PP-g-GMA) having a grafting yield in a range from 1 wt. % to 15 wt. %;
    providing a polyolefin comprising one or more propylene heterophasic copolymers, the polyolefin having an ethylene content of at least 10 wt. % based on the total weight of the polyolefin; and
    melt blending the polyolefin with a polylactic acid and the PP-g-GMA to form a compatiblized polymeric blend.

12. The method of claim 11, wherein the multifunctional acrylate comonomer comprises polyethylene glycol diacrylate, alkoxylated hexanediol diacrylate, or combinations thereof.

13. The method of claim 11, wherein the multifunctional acrylate comonomer comprises propoxylated neopentyl glycol diacrylate, diethylene glycol diacrylate, or tris(2-hydroxyethyl)isocyanurate triacrylate.

14. The method of claim 11, wherein from 80 wt. % to 99.5 wt. % of the polypropylene, from 0.5 wt. % to 20 wt. % of the glycidyl methacrylate, from 0.5 wt. % to 15 wt. % of the multifunctional acrylate comonomer, and from 0.05 wt. % to 1.5 wt. % of the initiator are contacted to form the PP-g-GMA.

15. The method of claim 11, wherein the propylene heterophasic copolymer is a propylene based polymer comprising at least about 50 weight percent polypropylene based on a total weight of the propylene heterophasic copolymer.

16. The method of claim 11, wherein the compatiblized polymeric blend has a melt flow rate of from 0.5 to 100 dg/min.

17. A melt blended compatiblized polymeric blend comprising:
    a polyolefin, wherein the polyolefin comprises one or more propylene heterophasic copolymers, the polyolefin having an ethylene content of at least 10 wt. % based on the total weight of the polyolefin;
    a polylactic acid; and
    a reactive modifier, wherein the reactive modifier comprises a glycidyl methacrylate grafted polypropylene (PP-g-GMA) that is produced by contacting a polypropylene, a glycidyl methacrylate, a multifunctional acrylate comonomer, and an initiator to form the PP-g-GMA having a grafting yield in a range from 1 wt. % to 15 wt. %.

* * * * *